I. B. BURROUGHS.
BEE-HIVES.
No. 195,257.    Patented Sept. 18, 1877.
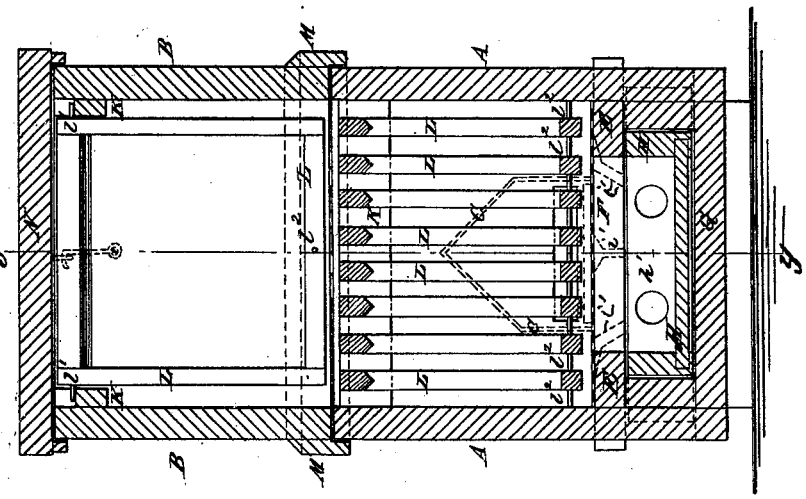
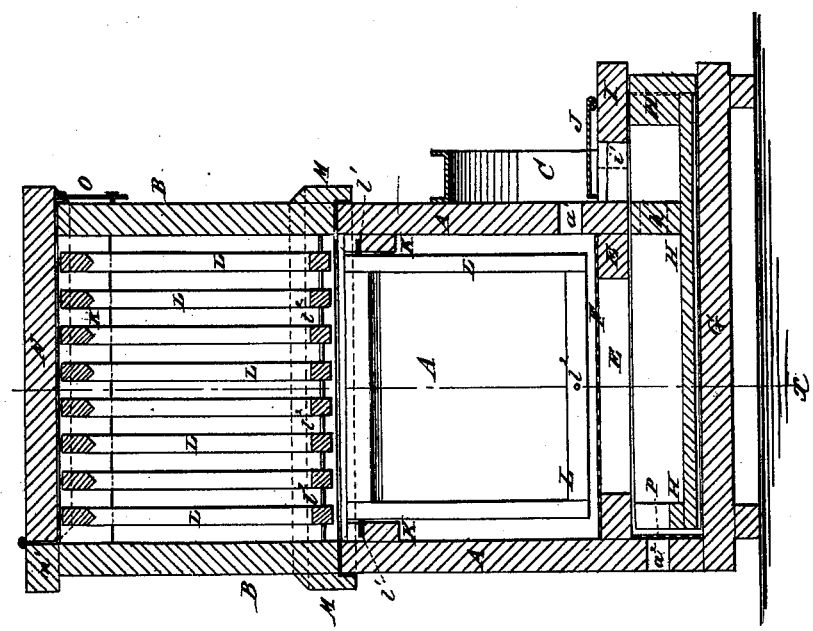
WITNESSES:
H. Rydquist
J. H. Scarborough
INVENTOR:
I. B. Burroughs.
BY
ATTORNEYS.

UNITED STATES PATENT OFFICE.

ISHAM B. BURROUGHS, OF TUSCALOOSA, ALABAMA.

IMPROVEMENT IN BEE-HIVES.

Specification forming part of Letters Patent No. 195,257, dated September 18, 1877; application filed April 16, 1877.

*To all whom it may concern:*

Be it known that I, ISHAM BERRY BURROUGHS, of Tuscaloosa, in the county of Tuscaloosa and State of Alabama, have invented a new and useful Improvement in Bee-Hives, of which the following is a specification:

Figure 1 is a vertical longitudinal section of my improved bee-hive, taken through the line $y\,y$, Fig. 2. Fig. 2 is a vertical cross-section of the same, taken through the line $x\,x$, Fig. 1.

Similar letters of reference indicate corresponding parts.

The object of this invention is to furnish improved bee-hives, which shall be simple in construction and convenient in use, enabling all the operations necessary in taking care of bees to be easily and conveniently performed, and thoroughly protecting the bees from moth.

The invention will first be described in connection with the drawings, and then pointed out in the claim.

A is the lower section or part of the hive, the bottom E of which is placed at a little distance above its lower end. The middle part of the bottom E is cut away, and the opening thus formed is covered with wire-gauze F, of such a fineness of mesh as will prevent moths from entering while allowing the droppings from the bees to drop through.

To the lower edge of the section A is attached the bottom G, the forward end of which projects, and between which and the bottom E is placed a drawer, H, which passes in through a slot in the lower part of the front of the hive.

The drawer H is divided into two compartments by a cross-partition, $h'$, placed beneath the front side of the section A, or nearly so, and in which are formed one or more holes to allow the millers to pass through.

The projecting forward part of the drawer H is covered by the platform I, upon which the bees alight, and from which they take flight. In the platform I, directly beneath the bee-entrance $a^1$ to the hive, is formed a slit, $i'$, through which the moths enter the drawer H. The slit $i'$ is covered with a plate, J, which is hinged at its forward edge to the platform I, and its rear edge is bent downward and rests upon the platform I. The plate J is thus supported at a sufficient height above the platform I to allow the millers to crawl beneath it and enter the slit $i'$.

The inner end of the drawer H is notched, to allow the light that enters through the hole or window $a^2$, in the rear side of the hive, to enter the said drawer H, which hole or window is covered with wire-gauze P.

With this construction the moths enter the forward dark compartment of the drawer H, see a little light entering through the holes in the partition $h'$, and pass through said holes into the inner compartment of said drawer, where they find the bee-droppings and lay their eggs, and from which they cannot find their way out, as the partition $h'$ is in the dark part of the drawer.

The bee-entrance $a^1$ is covered by a plate, C, bent into the form of a curved or angular arch. The inner edge of the plate C is attached to the front of the hive, and its outer edge is bent outward at right angles, so that the millers cannot approach the entrance $a^1$ from the side. The flanged guard C also guides the millers to the holes or slits $i'$ in the platform I, and which lead down into the drawer H.

To the front and rear sides of the section A, near its top, are attached cleats K, the upper edges of which are notched to receive pins $l^1$, attached to the upper corners of the comb-frames L.

To the sides of the bottom bars of the frames L are attached eye-screws $l^2$, to keep the lower parts of the frames L at the proper distance apart. The pins $l^2$, attached to the lower part of the comb-frames L, prevent the lower parts of the frames from falling upon each other, which would crush the combs and kill or cripple the bees. The pins $l^2$ and the pins $l^1$ enable the sections of the hives to be turned about in any way without injuring either the combs or bees, which is a great convenience in transferring bees.

B is the upper section of the hive, which is made of the same size as the part of the lower section above the bottom E. The section B is placed upon the top of the section A, and is kept in place by cleats M, attached to its outer side, and which overlap the upper part of the said section A.

The section B is provided with notched cleats K to receive the pins $l^1$ of the comb-frames L, in the same manner as the lower section A, except that the comb-frames in the upper section are placed at right angles with the comb-frames of the lower section.

The top N of the upper section B is hinged at one edge to a strip, $n'$, attached to the upper edge of one side of the said section B. The hinged top N is secured, when closed, by a hook and eye, O.

Having thus described my invention, I claim as new and desire to secure by Letters Patent—

The combination, with a bee-hive, of the flanged arch C over the entrance, the hinged plate J, the drawer H, and the platform I, having slits $i'$, substantially as shown and described, for the purpose specified.

ISHAM BERRY BURROUGHS.

Witnesses:
B. F. POWELL,
T. F. RICE.